(12) United States Patent
Bar-on et al.

(10) Patent No.: US 11,972,216 B2
(45) Date of Patent: Apr. 30, 2024

(54) AUTONOMOUS DETECTION OF COMPOUND ISSUE REQUESTS IN AN ISSUE TRACKING SYSTEM

(71) Applicants: Atlassian Pty. Ltd., Sydney (AU); Atlassian Inc., San Francisco, CA (US)

(72) Inventors: Noam Bar-on, San Francisco, CA (US); Sukho Chung, San Francisco, CA (US)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 223 days.

(21) Appl. No.: 17/504,361

(22) Filed: Oct. 18, 2021

(65) Prior Publication Data
US 2022/0036014 A1 Feb. 3, 2022

Related U.S. Application Data

(63) Continuation of application No. 16/421,535, filed on May 24, 2019, now Pat. No. 11,151,327.
(Continued)

(51) Int. Cl.
*G06N 20/00* (2019.01)
*G06F 40/10* (2020.01)
*G06F 40/186* (2020.01)
*G06F 40/216* (2020.01)
*G06F 40/289* (2020.01)
(Continued)

(52) U.S. Cl.
CPC ............. *G06F 40/30* (2020.01); *G06F 40/10* (2020.01); *G06F 40/186* (2020.01); *G06F 40/216* (2020.01); *G06F 40/289* (2020.01); *G06N 20/00* (2019.01); *G06Q 10/0633* (2013.01)

(58) Field of Classification Search
None
See application file for complete search history.

(56) References Cited

U.S. PATENT DOCUMENTS 8,005,841 B1 8/2011 Walsh et al.
8,725,795 B1 5/2014 Amacker et al.
(Continued)

OTHER PUBLICATIONS

Rong et al., "Feature Selection and Its Use in Big Data: Challenges, Methods, and Trends," IEEE Access, Feb. 22, 2019, copyright IEEE 2019, pp. 19709-19725. (Year: 2019).*
(Continued)

*Primary Examiner* — Amelia L Tapp
(74) *Attorney, Agent, or Firm* — Brownstein Hyatt Farber Schreck, LLP

(57) ABSTRACT

An issue tracking system configured to determine whether an issue request submitted by a user of the issue tracking system can, or should, be subdivided into two or more issue requests. In some implementations, the issue tracking system is configured to extract a content item of the issue request (e.g., title, description, and the like) in order to perform a semantic and/or syntactic analysis of that content item. Upon determining that the content item includes two or more clauses linked by a coordinating, subordinating, or correlative conjunction, the system can provide a recommendation to the user to submit discrete two or more issue requests, each one of which corresponds to a single linked clause of the content item.

14 Claims, 6 Drawing Sheets

Related U.S. Application Data

(60) Provisional application No. 62/811,972, filed on Feb. 28, 2019.

(51) Int. Cl.
  *G06F 40/30* (2020.01)
  *G06Q 10/0633* (2023.01)

(56) References Cited

U.S. PATENT DOCUMENTS

| | | |
|---|---|---|
| 8,972,396 B1 | 3/2015 | Zhang et al. |
| 9,892,414 B1 | 2/2018 | Henry et al. |
| 10,902,197 B1 | 1/2021 | Lakshmanan et al. |
| 2005/0108001 A1 | 5/2005 | Aarskog |
| 2015/0089409 A1 | 3/2015 | Asseily et al. |
| 2016/0110082 A1 | 4/2016 | Zhang et al. |
| 2018/0150571 A1* | 5/2018 | Douglas .................. H04L 51/52 |
| 2019/0026106 A1* | 1/2019 | Burton ...................... G06F 8/71 |
| 2019/0139004 A1 | 5/2019 | Vukovic et al. |

OTHER PUBLICATIONS

Lazaruk et al., "Semantic Web Recommendation Application," Proceedings of the Federated Conference on Computer Science and Information Systems, IEEE, pp. 1055-1062, 2012.

* cited by examiner

AUTONOMOUS DETECTION OF COMPOUND ISSUE REQUESTS IN AN ISSUE TRACKING SYSTEM

CROSS-REFERENCE TO RELATED APPLICATION(S)

This patent application is a continuation patent application of U.S. patent application Ser. No. 16/421,535, filed May 24, 2019, and titled "Autonomous Detection of Compound Issue Requests in an Issue Tracking System," and claims the benefit of U.S. Provisional Patent Application No. 62/811,972, filed Feb. 28, 2019, and titled "Autonomous Detection of Compound Issue Requests in an Issue Tracking System," the disclosures of which are hereby incorporated herein by reference in their entirety.

TECHNICAL FIELD

Embodiments described herein relate to issue tracking systems and, in particular, to systems and methods for providing one or more suggestions to subdivide an issue request input by a user of an issue tracking system into two or more discrete issue requests.

BACKGROUND

An organization or individual can leverage an issue tracking system to document and monitor completion of work related to a project or goal. In many cases, however, processes of adding, editing, and/or otherwise updating issues tracked in a conventional issue tracking system are unnecessarily time and resource consuming. As a result, users of conventional issue tracking systems typically prefer to interact with such systems as little as possible, which often leads to abstract, compound, and/or high-level issue requests submitted by users that, due to a lack of granularity and/or specificity, are difficult to accurately track.

SUMMARY

Embodiments described relate to an issue tracking system including a client device executing a client application.

The client application is coupled to a host service. The host service includes a processor configured to: receive an issue request from the client application and determine a divisibility score based on semantic content of a content item of the issue request. In response to a determination that the divisibility score satisfies a divisibility threshold, the processor of the host service generates two or more issue request templates based on the semantic content of the content item. The issue request templates can be populated with data extracted from the issue request. Thereafter, the host service can transmit the two or more populated issue request templates to the client application.

Some embodiments include a configuration in which the content item is an issue request description. In these examples, the semantic content of the issue request description may be, or can include, a set of lemmatized words extracted from the issue request description. The divisibility score may be increased upon a first determination that the set of lemmatized words includes at least a threshold number of lemmatized words associated with compound issue requests. Alternatively or additionally, the divisibility score may be decreased upon a second determination that the set of words does not include the threshold number of lemmatized words associated with compound issue requests.

Some embodiments include a configuration in which the processor may be configured to identify one or more previously-received issue requests that satisfy a similarity threshold when compared to the issue request. In response, the processor can populate the one or more issue request templates with data extracted from the one or more previously-received issue requests.

Some embodiments include a configuration in which the processor is further configured to determine a likelihood that the previously-received issue requests include data that is substantially similar to content of the original issue request.

Some embodiments include a configuration in which a threshold may be a first threshold, and the processor may be further configured to determine the likelihood satisfies a second threshold in order to identify the one or more issue records that are substantially similar to the original issue request.

Some embodiments include a configuration in which the client device is communicably coupled to the host service by a network and is configured to receive input from a user to generate the issue request. The client device may be a first client device of a group of client devices each configured to transmit at least one issue request to the processor of the host service. Each client device of the group of client devices may be coupled to the host service by the network.

Some embodiments include a configuration in which the processor of the host service is further configured to populate the one or more issue request templates with data extracted from the semantic content of the content item.

Some embodiments may include a configuration in which the data extracted from the issue request includes at least one of: an issue time to completion estimate, an issue category, an issue assignee, an issue reporter, or an issue priority.

Some embodiments described herein generally relate to a method for operating an issue tracking system to suggest to divide an issue request into two or more issue requests to a client application on a client device communicably coupled to the issue tracking system. Such a method includes the operations of: receiving an issue request from the client application; extracting a content item from the issue request; transmitting a signal with a suggestion to subdivide the issue request into a set of two or more issue requests to the client application upon determining that the content item satisfies a threshold; and causing a display of the client application to present the set of two or more issue requests to a user of the client application.

Some embodiments include a configuration in which the content item includes a complexity score that corresponds to a time estimation.

Some embodiments include a configuration in which the threshold is between, and includes, eight hours and twenty four hours.

Some embodiments include a configuration in which the content item includes a lemmatized set of words extracted from a description of the issue request.

Some embodiments include a configuration in which the threshold is a word count.

Some embodiments described relate to issue tracking system for suggesting one or more issues to a client application on a client device communicably coupled to the issue tracking system. As with other embodiments, the issue tracking system includes a host service and a database communicably coupled to the host service. The host service may be configured to: receive a first content item of a first issue request from the client application; identify a second issue request with a second content item that satisfies a similarity threshold when compared to the first content item;

access the database to identify a third issue request tagged as a subtask of the second issue request; generate a first issue request template from the second issue request; generate a second issue request template from the third issue request; and transmit a suggestion to replace the first issue request with the first and second issue request templates to the client application.

Some embodiments include a configuration in which the client application is configured to display the first and second issue request templates. The client application may be configured to receive additional issue data from a user to complete at least one of the first or second issue request templates and the client application may be configured to generate at least one subsequent issue request based on the completed first or second issue request template.

Some embodiments include a configuration in which the host service may be further configured to determine a divisibility score based on semantic content of the content item of the first issue request prior to identifying the second issue request.

Some embodiments include a configuration in which the content item of the first issue request is a lemmatized set of words based on an issue request title or description.

Some embodiments include a configuration in which the content item of the first issue request is a tokenized set of words based on an issue request title or description.

Some embodiments include a configuration in which the content item of the first issue request includes a time estimation. In these examples, the divisibility score includes a numerical value based on the time estimation and the first threshold may be between, and can include, eight hours and twenty four hours.

Some embodiments include a configuration in which the numerical value is further based on one or more of: an issue request assignee, an issue request reported, a project, a project type, an issue request type, and an issue request category or tag.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
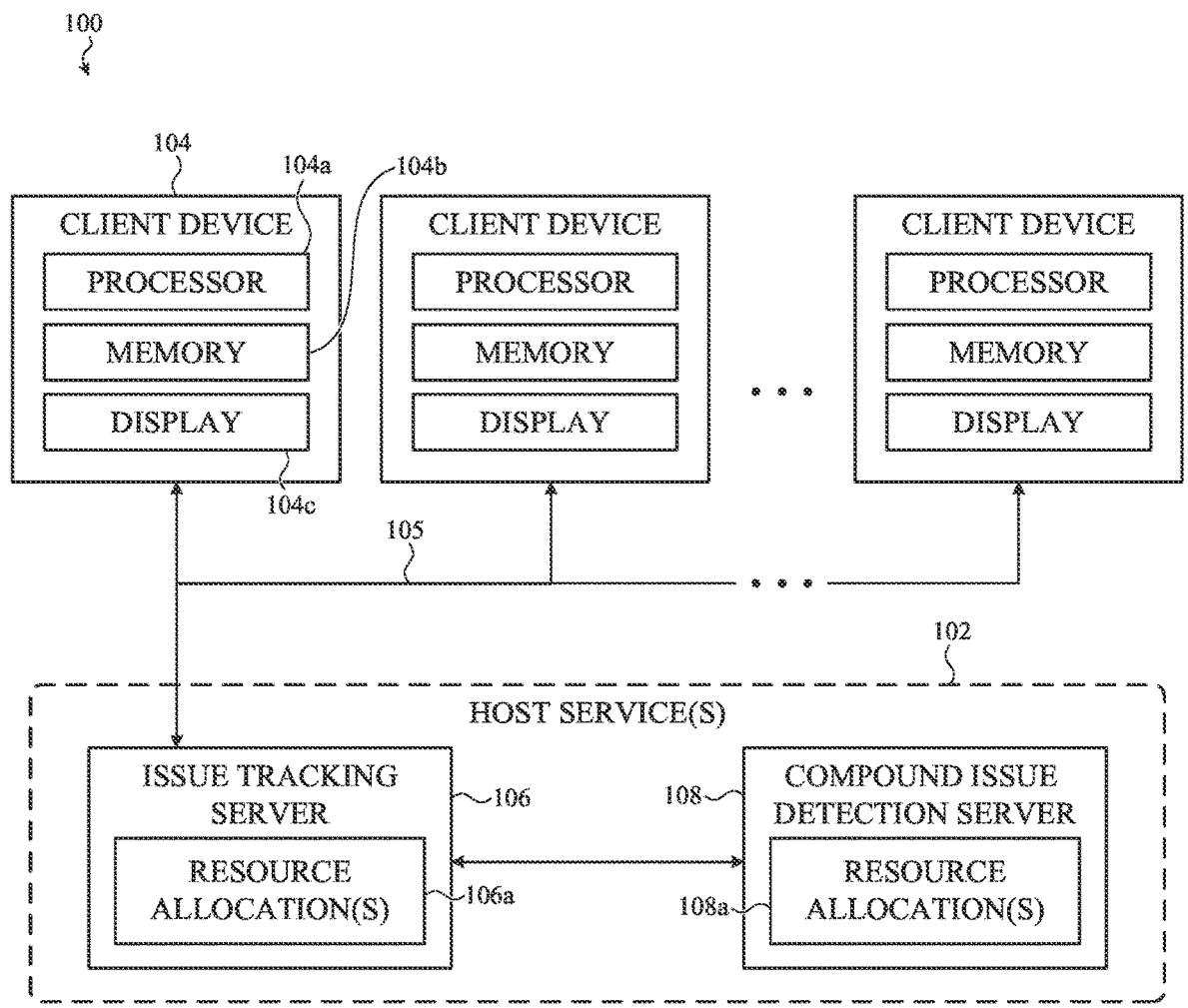
FIG. 1 is a schematic representation of an issue tracking system, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

An issue tracking system, as described herein, is a project management tool that can be implemented in whole or in part as software executed by a virtual or physical server or other computing appliance that provides a team of individuals with a means for documenting, tracking, and monitoring completion of work as discrete tasks related to completion, development, or maintenance of a defined project or goal.

For simplicity of description, embodiments described herein reference an issue tracking system configured for use by a software development team to track completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). However, it is appreciated that this is merely one example configuration and, in other cases, an issue tracking system can be configured for non-software tracking purposes, such as for use by a human resources team, an information technology support group, and so on.

An issue tracking system, such as described herein, increases efficiency of a team of software developers working on a common goal or project by facilitating the organization of assignment of discrete items of work to an individual or team of individuals most suited to perform that work. More particularly, each item of work tracked by an issue tracking system is referred to as an "issue" that is typically assigned to a single individual to complete. Example "issues" can relate to, without limitation: a task to identify the cause of a software bug; a task to perform a feasibility assessment for implementation of a new feature; a task to fix an identified software bug; information identifying a software bug; and so on.

Embodiments described herein reference systems and methods for obtaining and/or otherwise extracting signals from text input by a user entering an issue request to an issue tracking system to trigger a suggestion to that user to subdivide the issue request into two or more issue requests. The systems and methods described herein may be particularly useful to subdivide an issue request entered by a user (or automatically or autonomously by another system) into multiple discrete issue requests, each focused to a single actionable topic, bug, or task. As a result of these constructions, the issue tracking system can provide more accurate and precise time estimations, progress reports or estimations, and so on.

For purposes of the following disclosure, the terms "issue report," "issue," and "ticket" may be used to generally refer to an issue or item that is being tracked and/or stored by an issue tracking system. The term "issue request" is generally used to describe input provided by a user to an issue tracking system that may result in a creation of an "issue record" in a database by that system.

As used herein, the term "issue record" refers to a discrete database record associated with an issue or item being tracked by an issue tracking system. Although not required, an issue record can be stored, at least temporarily, in a database accessible to and/or managed by an issue tracking system. While these terms are used herein with respect to specific examples and potential implementations, it may be appreciated that these are merely examples and other embodiments can be configured to receive, anticipate, predict, and/or recommend additional or alternative data, user inputs, or issue requests or issue records associated with an issue tracking system.

Many embodiments described herein are directed to systems and methods of determining a likelihood that an issue request submitted by a user to an issue tracking system is a "compound" issue request. In another, non-limiting phrasing, embodiments described herein are directed to systems and methods of extracting or obtaining a signal from text input by a user when entering an issue request that the issue request is likely to be a "compound" issue request.

As used herein, the phrase "compound issue request" (and, additionally, "compound issue record") refers to an issue request (or record) that can, or should, be divided into multiple discrete issue requests or records.

If an extracted signal and/or a determined likelihood satisfies a threshold, the system provides a suggestion to the user to replace the issue request with two or more discrete issue requests that are more granular and/or more specific than the initial issue request submitted by the user. As a result of these and other constructions and architectures described herein, focused and granular issue requests can be provided in batches to an issue tracking system in a substantially more time-efficient and resource-efficient manner.

The systems described herein can determine a likelihood (or obtain or receive a signal) that an issue request submitted by a user is a compound issue request in a number of suitable ways. In some examples, an issue tracking system can be configured to analyze semantic and/or syntactic content of one or more content items (e.g., title, description, tags, assignee, reporter, project, category, and so on) of the issue request to determine whether that content item may be used to refer to two separate and/or discrete tasks.

For example, the issue tracking system can be configured to determine if two or more clauses in an issue request title are linked by a conjunction, such as a coordinating, subordinating, or correlative conjunction. Upon determining that the issue request title does contain a coordinating, subordinating, or correlative conjunction, the system can be configured to provide a suggestion to the user to submit two or more separate issue requests, each corresponding to one clause linked by the identified conjunction.

In another example, the issue tracking system can be configured to determine if two or more clauses in an issue request description are preceded or separated by a list delimiter (e.g., punctuation, newline or other whitespace characters, and so on) in a manner resembles, or takes the general form of a bullet-point list. Upon determining that the issue request title does contain a list delimiter, the system can be configured to provide a suggestion to the user to submit two or more separate issue requests, each corresponding to one clause linked by the identified delimiter.

In one example, an issue request title entered by a user may be "Update Localization Strings for Android® and iOS® Apps." Upon analysis of this title, the system can identify that the coordinating conjunction "and" is used to link two separate clauses of "Android®" and "iOS® Apps." In response to the identification that two clauses are linked by a conjunction, the system can determine a high likelihood that the issue request submitted by the user is a compound issue request. Thereafter, the system can provide a suggestion to the user to submit two separate issue requests—one associated with each linked clause—instead of the single issue request initially submitted by the user. For example, the system may suggest to the user that the user enter a first issue with the suggested title of "Update Localization Strings for Android®" and a second issue request with the suggested title of "Update Localization Strings for iOS®." In this example, the system is configured to suggest the titles of each suggested issue based on a semantic analysis of the title initially entered by the user. More specifically, the system in this example is configured to identify that the preposition "for" follows the verb phrase "Update Localization Strings." Based on this identified syntax and/or structure, the system can generate a suggested title for each suggested issue request.

The suggested title can be based on, and/or can include, the identified verb phrase, the identified preposition, and one of the two clauses linked by the identified conjunction. As may be appreciated, the system may omit the identified conjunction from the suggested title, but this may not be required. In some examples, the system may be further configured to identify that the plural noun "Apps" following the identified linked clauses of clauses of "Android®" and "iOS® Apps" can be made singular and appended to each suggested title. In these examples, the system may suggest that the user enter a first issue with the suggested title of "Update Localization Strings for Android® App" and a second issue request with the suggested title of "Update Localization Strings for iOS® App." It may be appreciated that this singular example is not exhaustive and that other syntactic and sematic structures can be identified by, and leveraged by, a system such as described herein.

The systems described herein can determine a likelihood that an issue request submitted by a user is a compound issue request using one or more of a variety of different techniques. Examples include, but may not be limited to: leveraging a trained predictive model to identify specific phrases or terms that may signal a compound issue; leveraging a semantic analysis engine to identify specific phrasing or sentence structure that may signal compound issues; leveraging a text preprocessing analysis engine to tokenize, lemmatize, normalize, or otherwise simplify words entered by a user, to remove certain characters or phrases (e.g., newlines or stop words), and so on in order to generate a bag of words, bag of parts of speech, or any other numerical statistic(s) or metadata (e.g., length of text, number of sentences, number of tokens, lemma types) that may be compared to a database of previously-identified compound issue records and/or to a database of word/phrase vectors; leveraging an issue request history and similarity scoring between an issue request submitted by a user and one or more previously-submitted issue requests (e.g., identifying a similarity to an issue request that was previously subdivided into multiple discrete issue requests, identifying a similarity to an issue request that is causally related to another issue request or issue request type, and the like); using a time estimation entered by a user as a signal that the issue request can be divided into multiple discrete issue requests; and so on.

More generally, an issue tracking system—such as described herein—can be configured to monitor, track, or otherwise analyze issue records having defined relationships to other issue records (and/or monitor, track, or otherwise analyze issue record content having a relationship to other issue record content) in order to train or update a predictive model that can be leveraged to determine whether an issue request entered by a user is likely to be a compound issue. In this manner, a predictive model, such as described herein, can be configured to determine a statistical likelihood that a given issue request or issue record can be subdivided into two or more discrete issue requests.

Thereafter, the system can suggest that the user substitute the entered issue request with two or more different issue requests. In further examples, the system can be configured to periodically scan one or more issue records already being tracked by the system to determine whether those already-entered issue requests can be subdivided into two or more discrete issue records.

Once a predictive model—such as described herein—is suitably trained, it can be leveraged by an issue tracking system to determine a likelihood that a particular issue request submitted by a user is or is not expected to be a compound issue request that can be subdivided into multiple discrete issue requests. If the determined likelihood satisfies a threshold (predetermined, variable, or otherwise), the issue tracking system can generate a suggestion to the user to submit one or more additional, related, issue requests. In many examples, the suggested additional issues can be prepopulated with content extracted from the issue request submitted by the user (e.g., project, epic, story, reporter, assignee, categorization, and the like) in addition to content extracted from one or more previously submitted issue requests or existing issue records. In this manner, the time required to enter multiple discrete issues can be dramatically reduced, substantially improving the user experience of interacting with an issue tracking system.

These foregoing and other embodiments are discussed below with reference to FIGS. 1-4. However, those skilled in the art will readily appreciate that the detailed description given herein with respect to these figures is for explanatory purposes only and should not be construed as limiting.

FIG. 1 is a schematic representation of an example issue tracking system. In the illustrated embodiment, the issue tracking system 100 is implemented with a client-server architecture including a host service 102 that communicably couples (e.g., via one or more networking or wired or wireless communication protocols) to one or more client devices, one of which is identified as the client device 104. It may be appreciated that other client devices may be configured in a substantially similar manner as the client device 104, although this may not be required of all embodiments and different client devices can be configured differently and/or may transact data or information with, and/or provide input(s) to, the host service 102 in a unique or device-specific manner.

The client device 104 can be any suitable personal or commercial electronic device and may include, without limitation or express requirement, a processor 104*a*, volatile or non-volatile memory (identified, collectively, as the memory 104*b*), and a display 104*c*. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104*a* of the client device 104 can be configured to execute an application (herein referred to as a "client application") stored, at least in part, in the memory 104*b*. The client application is configured to access and communicate with the host service 102 and to securely transact information or data with, and provide input(s) to, the host service 102. In some embodiments, the client application may be a browser application configured to access a web page or service hosted by the host service 102 that is accessible to the client device 104 over a private or public network that may, in some embodiments, include the open internet.

In many embodiments, the host service 102 is configured to operate within or as a virtual computing environment that is supported by one or more physical servers including one or more hardware resources such as, but not limited to (or requiring) one or more of: a processor; a memory; non-volatile storage; networking connections; and the like. For simplicity of description and illustration, these example hardware resources are not shown in FIG. 1.

In many embodiments, the host service 102 can include a number of discrete subservices or purpose-configured modules, containers, or virtual machines each configured to perform, coordinate, serve, or otherwise provide one or more services, functions, or operations of the host service 102, such as the operations of determining or inferring one or more patterns in issue reporting or issue content that may correspond to a compound issue request, comparing issue requests to previously-received compound issue requests or records, determining a likelihood that an issue request or an issue record is related to another issue request or an issue record, and so on.

To facilitate these operations, the host service 102 includes an issue tracking server 106 configured to receive issue requests from the client device 104 via the network 105. As noted with respect to other embodiments described herein, as an issue request—and/or portions thereof—is received from the client application 104*a* executed by the client device 104, the issue tracking server 106 can communicate with a compound issue detection server 108 that is configured to perform an analysis on the issue request received by the issue tracking server 106 to determine a likelihood that the issue request is a compound issue request that can be subdivided into two or more issue requests.

As noted with respect to other embodiments described herein, the compound issue detection server 108 of the host service 102 can include a predictive model that, in turn, can be trained, updated, and/or configured by analyzing issue records received by the issue tracking system 100 and, in particular, the issue tracking server 106.

Iteratively or otherwise, the compound issue detection server 108 can consume user-supplied content (e.g., description, summary, title, categorization, project, team, assignee, reporter, and so on) associated with each issue record of a given set of previously-received issue records (in turn corresponding to a set of issue requests received by the issue tracking system 100) to assemble a database or corpus of issue record contents. As used herein, the verb "consume" refers to one or more operations that can be performed in sequence, series, parallel, or otherwise related to the intake, processing, analysis, and/or temporary or persistent storage of digital or analog data or information in any suitable form or format, whether encrypted or not. Consuming data can refer to, without limitation: processing raw text; processing hexadecimal data; extracting words or phrases from a string variable; performing semantic analysis; creating or obtaining metadata; and so on.

In some cases, the compound issue detection server 108 can also consume user-supplied content associated with deleted issue records, partially-complete or otherwise abandoned issue requests, and/or closed issue records, but this may not be required.

Example issue records that can be supplied to the compound issue detection server 108 can include, but may not be limited to: previously opened issue records; previously closed issue records; issue records related to a project; issue records related to a particular epic; issue records related to a particular story; issue records related to a particular company or company type (e.g., software development corporation, human resources corporation, project management corporation); and so on.

Data extracted from such issue records that can be consumed (or otherwise received or collected and/or stored) by the compound issue detection server 108 to train and/or define one or more operations of the compound issue detection server 108 can include, but may not be limited to: issue title; issue description; issue summary; issue links; issue relationships; issue dependencies; issue projects; issue tags, groups, clusters, or categorizations; and so on. The foregoing examples are not exhaustive and it may be appreciated that other data or content may be used by an issue tracking system, such as described herein, to train, update, and/or define one or more operations of the compound issue detection server 108.

Thereafter, the data consumed by the compound issue detection server 108 can be analyzed (and, optionally, normalized, lemmatized, segmented, or otherwise preprocessed) to determine whether statistical inferences can be derived therefrom. For example, text content derived from issue records can be segmented by words, phrases, or sentences to determine which content occurs most frequently in a given project, for a given category or tag, for a given time estimation, or any other given content item type.

In this manner, a database of terms and phrases (collectively, herein "keywords") that are associated with particular projects, tags, time estimations, and so on, can be created. The compound issue detection server 108 can leverage this database to determine a statistical likelihood content input by a user into a single issue request that includes two or more keywords that correspond to different projects, different tags, different time estimations, and the like. In this manner, the determined statistical likelihood is, or corresponds to, a likelihood that the issue request entered by the user is a compound issue request that can be subdivided into multiple discrete issues.

For example, in one embodiment, data consumed by—or otherwise received or obtained by—the compound issue detection server 108 can be analyzed to determine a statistical value or score that corresponds to a likelihood that the keyword "Android" is substantially more frequently used in issue reports associated with a project "Android Mapping Application" than in other projects. Similarly, data consumed by the compound issue detection server 108 can be analyzed to determine a statistical value or score that corresponds to a likelihood that the keyword "iOS" is substantially more frequently used in issue reports associated with a project "Apple iOS Mapping Application" than in other projects. As a result of these correlations, the compound issue detection server 108 can determine that if a user submits a single issue request that references both "Android" and "iOS," there is a statistical likelihood that the single issue request should be split into at least two discrete issue requests—one referencing only "Android" and one referencing only "iOS." Upon determining that the determined likelihood satisfies a threshold (which may be fixed or variable), the compound issue detection server 108 can generate a suggestion to be communicated to the client application executed by the client device 104.

In still further examples, data consumed by the compound issue detection server 108 can be analyzed in a different manner to further train or define a behavior of the compound issue detection server 108. For example, in some embodiments, one or more topic modeling operations (e.g., Latent Dirichlet Allocation operation(s), Non-negative Matrix Factorization operation(s) and so on) can be performed. In this example, clusters of (optionally, lemmatized or stemmed) words or phrases related to a particular topic model or other semantic structuring can be added to a database that can be leveraged by the compound issue detection server 108 to determine whether a single issue request entered or submitted by a user is likely to be a compound issue that can be subdivided into two or more issue requests.

In some examples, the compound issue detection server 108 can be further configured to perform one or more semantic and/or syntactic analyses of issue request content supplied by a user. Such content can include, but may not be limited to: description; summary; title; categorization; project; team; assignee; reporter; and so on.

In these examples, the compound issue detection server 108 can be configured to identify text content entered by a user that includes at least one conjunction. The conjunction can be a coordinating, subordinating, or correlative conjunction. Upon identifying a conjunction, the compound issue detection server 108 can semantically tag, or otherwise grammatically identify, one or more noun or verb phrases linked by the identified conjunction. Thereafter, the compound issue detection server 108 can compare the identified phrases to the database of keywords referenced above to determine whether the issue request entered by the user contains two or more keywords that are linked by the identified conjunction. As with other examples described herein, upon determining that the issue request entered by the user includes multiple keywords connected by a conjunction, the compound issue detection server 108 can determine that there is a statistical likelihood (or score, or value, and so on) that the single issue request entered by the user should be split into at least two discrete issue requests, one referencing only one of each identified phrase. Upon determining that the statistical likelihood satisfies a threshold (which, as noted above, may be fixed or variable), the compound issue detection server 108 can generate a suggestion to be communicated to the client application executed by the client device 104.

It may be appreciated that the foregoing is not exhaustive; the compound issue detection server 108—or particularly, a machine learning model or algorithm implemented by the compound issue detection server 108 (e.g., Bayesian network, neural network, support vector machine, and so on) can be trained and/or defined or configured to operate in any suitable manner. In many cases, however, the compound issue detection server 108—such as described herein—is trained by consuming historical issue record data stored in the issue tracking system 100.

Further, it may be appreciated that any number of historical issue records can be used and/or consumed by the compound issue detection server 108 in the course of training the same. Alternatively, any appropriate set or subset of issue records can be consumed.

Example sets of issue records that can be used to train or otherwise develop or automatically improve the function of one or more machine learning algorithms implemented by the compound issue detection server 108 can include (without limitation): all issue records stored by the issue tracking system 100, regardless of client, epic, story, project, group, or otherwise; only issue records associated with a particular client or business; only issue records associated with a particular client or user type (e.g., large-cap companies, small-cap companies, software development companies, human resources companies, and so on); only issue records associated with a particular group of users (e.g., a particular software development group); only issue records associated with a particular project; only issue records associated with a particular product platform (e.g., Apple iOS® software project or Google Android® software product); and so on.

The preceding examples are not exhaustive; it may be appreciated that in some embodiments, training data supplied to, and consumed by, the compound issue detection server 108 can be limited, curated, or otherwise tailored in any suitable manner to assist in the identification of compound issues. Alternatively, training data can be entirely unlimited and may span different users, different instances of different issue tracking systems, and so on. In different embodiments, different training data—or sets of training data—may be appropriate, preferred, or otherwise used.

For example, as noted above, the compound issue detection server 108 can be configured to consume content of an issue request as it is being entered by a user (e.g., in real time). More specifically, as a user enters content to an issue request form (e.g., displayed by the display 104c of the client device 104) prior to submitting the issue request to the issue tracking system 100, the partially-complete issue request content entered by the user can be received by the issue tracking system 100. In response, the compound issue detection server 108 can extract keywords, perform a text normalization operation (e.g., sentence segmentation, lemmatization, stop word removal, and so on), and/or perform one or more topic modeling operations.

Thereafter, while the user continues to enter content, the compound issue detection server 108 can compare the resulting keywords, normalized text, semantic content (e.g., presence or absence of prepositions, conjunctions, verbs, adjectives, and so on), and/or topic models (collectively, herein "extracted features") to the previously-generated database(s) of keywords, text, and/or topic models in order to determine whether the user is entering a compound issue request that should be subdivided into multiple discrete issue requests. The compound issue detection server 108 can be configured to identify partial or identical matches.

The compound issue detection server 108 can compare features (e.g., keywords, normalized text, semantic content, topic models) extracted from content entered by a user to entries in one or more previously-generated database(s) of keywords, text, and/or topic models in a number of suitable ways. Examples include, but are not limited to, calculations and/or operations to determine: Levenshtein distance; cosine similarity calculation; Manhattan distance calculation; semantic similarity; lemmatized string similarity; term frequency comparison; document or field term frequency comparisons; Jaro-Winkler distance; Jaccard similarity; and the like.

In many cases, a comparison leveraged by the compound issue detection server 108 can output a similarity value, a divisibility score, or other metric or score that can be compared against a similarity threshold to determine whether an extracted feature is sufficiently similar to an entry in the database (e.g., a partial match). For example, a user may enter data from which the string "Android" is extracted. The database may include the term "AndroidOS" but may not include the literal term "Android." In this example, the compound issue detection server 108 can be configured to determine that the extracted feature of "Android" is statistically similar to the database entry of "AndroidOS."

It may be appreciated that such similarity thresholds (e.g., for partial database matches) can vary from embodiment to embodiment and from comparison technique or method to comparison technique or method. For example, a similarity threshold related to a Levenshtein distance calculation may be different from a similarity threshold related to a cosine similarity calculation.

Once a determination is made by the compound issue detection server 108 that a particular extracted feature is sufficiently similar to an entry in the database of keywords, the compound issue detection server 108 can determine and output a statistical confidence or value that corresponds to a likelihood that the issue request submitted by the user is a compound issue.

Thereafter, the determined likelihood can be compared to a confidence threshold. Upon determining that the determined likelihood output from the compound issue detection server 108 satisfies the confidence threshold—which may vary from embodiment to embodiment—the issue tracking system 100 can provide a recommendation to the user (e.g., via communication with the client device 104 over the network 105) to subdivide the issue request entered by the user into two or more separate issues.

In further examples, the compound issue detection server 108 of the host service 102 can leverage the database of keywords or other extracted features or data representations thereof—and/or one or more features extracted from one or more compound issue requests—to automatically prepopulate one or more fields or contents of a suggested issue request to a user of the issue tracking system 100.

For example, if the compound issue detection server 108 identifies that a user-supplied issue title of "Fix Authentication Bug in Email and Calendar" contains the conjunction "and" linking the noun phrases "email" and "calendar" (both of which are found in a keyword/extracted feature database as related to the "Email Project" and the "Calendar Project" respectively), the compound issue detection server 108 of the host service 102 may determine that the content entered by the user is a compound issue request. In other words, the compound issue detection server 108 may determine, without limitation: a low statistical likelihood that the extracted feature of "email" is associated with the project "Calendar Project;" a high statistical likelihood that the extracted feature of "email" is associated with the project "Email Project;" and a low statistical likelihood that the extracted feature of "email" is associated with any project apart from the project "Email Project." A similar set of determinations can be made for the extracted feature of "calendar." Thereafter, the compound issue detection server 108 can combine these statistical likelihoods (which may be in the form of a normalized value, such as a confidence score ranging from 0 to 1) in a suitable manner. In one example, the compound issue detection server 108 can determine which of a set of statistical likelihoods is greatest. In this example, the statistical likelihood that the extracted feature of "email" is exclusively associated with the project "Email Project" is greatest among the set of statistical likelihoods derived from the extracted feature of "email." Similarly, in this example, the statistical likelihood that the extracted feature of "calendar" is exclusively associated with the project "Calendar Project" is greatest among the set of statistical likelihoods derived from the extracted feature of "calendar."

Thereafter, the compound issue detection server 108 can determine that the content entered by the user includes more than two terms or extracted features that are exclusively associated with different projects. In other words, the compound issue detection server 108 can calculate a divisibility score that is based on the determination that more than one extracted feature is associated with more than one project. In one example, the divisibility score is a normalized integer ranging from 0 to 1 that corresponds to a prediction by the compound issue detection server 108 of a likelihood that the content entered by the user is a compound issue that should be divided. In one example, the divisibility score may be an average of the statistical likelihood that the extracted feature of "email" is associated with the project "Email Project" and the statistical likelihood that the extracted feature of "calendar" is associated with the project "Calendar Project." For example, if the statistical likelihood that the extracted feature of "email" is exclusively associated with the project "Email Project" is 0.7 and if the statistical likelihood that the extracted feature of "calendar" is exclusively associated with the project "Calendar Project" is 0.9, the compound issue detection server 108 may calculate a divisibility score of 0.8.

In some examples, the divisibility score can be biased or weighted by the number of values that are used to generate the divisibility score. For example, continuing the preceding example, the compound issue detection server 108 may further determine that the extracted feature of "authentication bug" has a high statistical likelihood (e.g., 0.55) of being related to the project "Authentication Server." In this example, the compound issue detection server 108 may determine a different divisibility score than in the previous example because three separate extracted features are related to different projects. In one example, the compound issue detection server 108 may combine the statistical likelihoods of 0.7, 0.9, and 0.55 by performing a Bayesian calculation of the likelihood of a compound issue.

It may be appreciated that the foregoing examples are not exhaustive; a compound issue detection server 108 such as described herein can generate a divisibility score from information derived from one or more extracted features in any suitable manner.

Thereafter, the compound issue detection server 108 can compare the divisibility score to a threshold to determine whether the score satisfies a threshold. If the divisibility score satisfies the threshold, the compound issue detection server 108 can presume that a compound issue has been affirmatively detected. For example, in the preceding example, in which the compound issue detection server 108 calculates a divisibility score of 0.8, the compound issue detection server 108 may determine that the divisibility score satisfies a threshold of 0.5.

In response to this determination, the compound issue detection server 108 can suggest to the user two separate issues, each prepopulated with a suggested title including the user-supplied content preceding the identified preposition "in," the identified conjunction, and one of the two identified noun phrases. More specifically, the compound issue detection server 108 can be configured to suggest to the user a first issue with the title "Fix Authentication Bug in Email" and a second issue with the title of "Fix Authentication Bug in Calendar." Optionally, the compound issue detection server 108 may be configured to omit the extracted keyword. In these examples, the compound issue detection server 108 may suggest to the user to open a first issue in the Email Project entitled "Fix Authentication Bug" and to open a second, separate, issue in the Calendar Project also entitled "Fix Authentication Bug."

The compound issue detection server 108 can be configured to suggest subdividing an issue request and/or to suggest one or more (optionally) prepopulated issue requests to the user in a number of suitable ways. For example, continuing the preceding example, a graphical user interface shown on the display 104c of the client device 104 may be configured to display a notification after the client device 104 receives a signal, data, or information in a formatted or unformatted manner from the host service 102. The data received can be used by the client device 104 to generate a notification that reads: "This issue request appears to reference both the Email Project and the Calendar Project. Would you like to subdivide this issue request into two separate issues with the title 'Fix Authentication Bug,' one opened in the Email Project and one opened in the Calendar Project?" In another simpler example, the graphical user interface may be configured to display a notification that reads: "This issue request appears to reference multiple projects. Would you like to subdivide this issue request?" In another example, the graphical user interface may be configured to display a notification that reads: "This issue request appears to reference multiple projects. Would you like to remove all references to the Email Project or the Calendar Project?" In another example, the graphical user interface may be configured to display a notification that reads: "This issue request appears to reference multiple projects. Would you like to add this issue request to each referenced project, along with related issues?"

It may be appreciated that these examples are not exhaustive; a suggestion can be provided to a user in any suitable manner. Examples include: providing a notification that a compound issue is detected; providing a notification that a compound issue is detected and two or more suggested issue requests are available; changing a color in a graphical user interface to indicate that a suggestion is available to the user; generating a sound to indicate that a suggestion is available to the user; and so on.

In some embodiments, no notification may be provided to the user. In these cases, an issue request entered by the user that is determined to be a compound issue may be autonomously or otherwise automatically subdivided into multiple discrete issues according to the embodiments and methods described herein.

In still further examples, the compound issue detection server 108 and/or the issue tracking system 100 may provide other suggestions to a user based on a determination that an issue request entered by the user is a compound issue request.

For example, (optionally) after determining that an issue request is likely to be a compound issue request, the compound issue detection server 108 and/or the issue tracking system 100 can leverage an issue record history or issue report history to determine content (e.g., title, description, keywords, and so on) that can be suggested to the user for one or more discrete issue requests that can replace the compound issue request entered by the user.

In these embodiments, the compound issue detection server 108 may determine that at least one extracted feature or keyword of the issue request entered by the user is substantially similar (e.g., via a semantic similarity comparison, a document similarity comparison, and the like satisfying a threshold value) to another extracted feature obtained from another issue request or record received in the same or a different project previously entered by that user or another user. For example, the compound issue detection server 108 may be configured to detect a compound sentence, divide that sentence into discrete parts or noun/verb phrases, extract one or more features from each noun/verb phrase, compare the extracted features to a database of extracted features, select from the database previously-extracted features that are most similar to the feature(s) extracted from the sentence parts, determine projects associated with the previously-extracted features, and determine whether the compound sentence includes content that refers to more than one project tracked by the issue tracking system 100.

In another embodiment, after identifying a previously-entered similar issue, the compound issue detection server 108 and/or the issue tracking system 100 can extract one or more features from the previously-entered similar issue and can provide those extracted issues to the user as a suggestion or as suggested issue request content.

In still further examples, the compound issue detection server 108 can be configured to identify a compound issue based on a user-supplied complexity and/or time-to-completion estimation. In these embodiments, the compound issue detection server 108 can be configured to extract one or more features from an issue request entered by a user and can compare those extracted features to a threshold value. For example, a user may estimate that an issue request will take two weeks to complete. In alternative examples, a user may estimate that an issue request has a high complexity score. By combining one or more databases of closed issues or pending issues for similar issues or similar complexity scores (reported by the same or a different user), the compound issue detection server 108 may determine that the complexity score entered by the user is likely associated with a week of work.

In this example, the compound issue detection server 108 can extract the numerical value of two weeks (which may be converted into another unit, such as seconds or hours) from the time-to-complete field and can compare that numerical value to a numerical threshold, such as eight hours. In this example, the compound issue detection server 108 may determine that two weeks is greater than eight hours and, as a result, the issue report submitted by the user is likely a compound issue that should be subdivided into multiple discrete issues. In this example, the compound issue detection server 108 can be configured to suggest subdividing the issue request by generating a notification that reads: "This issue request is estimated to take two weeks. Would you like to break this task into subtasks with shorter time-to-completion?"

These foregoing examples are not exhaustive. More generally and broadly, it is appreciated that the issue tracking system 100 and in particular the compound issue detection server 108 of the issue tracking system 100 can be configured to leverage, utilize, or employ any suitable pattern recognition or classification algorithm, probabilistic model, machine learning technique (whether trained or untrained), artificial intelligence method, or any suitable combination thereof, to detect, define, determine, or otherwise infer one or more patterns in, and/or logical or causal relationships between, different issues, different issue content, successions or sequences of issues, or groups of issues reported to the issue tracking system 100.

More generally, it may be appreciated that the issue tracking system 100 may be configured to detect, define, determine, or otherwise infer one or more patterns, or relationships in, without limitation: a history or log of issues reported to the system for a particular project or epic and/or categorized or grouped in a particular manner; the time between reports of different issues having similar categorization; text content of one or more issues reported to the system; issues reported by or assigned to a particular user of the system; issues related to a particular task or story associated with a particular project (or story, or epic, or other project division or grouping) tracked by the system; and the like.

Further, it may be appreciated that any suitable means of determining a pattern or other logical or causal link between particular content in an issue request submitted by a user and a likelihood that that issue request should be subdivided into multiple discrete issues can be used.

As such, generally and broadly, it is understood that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, the issue tracking system 100 of FIG. 1 can be implemented in a number of suitable ways. As illustrated, the host service 102 includes one or more purpose-configured modules or components each configured to perform a discrete task associated with the operation of the issue tracking system 100.

In particular, as noted above, the host service 102 includes an issue tracking server 106 and a compound issue detection server 108. It may be appreciated that although these functional elements are identified as separate and distinct "servers" that each include allocations of physical or virtual resources (identified in the figure as the resource allocations 106a and 108a, respectively)—such as one or more processors, memory, and/or communication modules (e.g., network connections and the like)—that such an implementation is not required. More generally, it may be appreciated that the various functions described herein of a host service 102 can be performed by any suitable physical hardware, virtual machine, containerized machine, or any combination thereof.

In the illustrated example, the issue tracking server 106 of the host service 102 can be configured to manage and maintain a record of issues reported in one or more projects tracked by the issue tracking system 100. In addition, the issue tracking server 106 of the host service 102 can be configured to communicably couple to the client device 104 via the network 105 in order to exchange information with and/or receive input(s) from the client device 104 in the course of tracking and/or documenting progress of completion of one or more issues of one or more projects tracked by the issue tracking system 100.

Information or data related to projects tracked by the issue tracking system 100, such as a codebase of a software development project, can be stored, in many embodiments, in a database managed by a code repository server (which may be a portion of the compound issue detection server 108, or may be implemented as a separate and discrete server or service), which can be communicably and securely coupled to the issue tracking server 106. The repository server may be used to store or maintain a repository of issue records, issue record groups, issue record clusters, and/or other data related to the creation and maintenance of issues. The database(s) managed by the repository server can be implemented with any suitable known or later-developed database or digital information storage technology or technique. In many examples, the repository server is configured to track and maintain a record of changes made to data or information stored in the database(s) managed by the repository server, but this may not be required.

In many examples, the issue tracking server 106 can be configured to receive, over the network 105, from the client device 104 (e.g., via user input provided through a graphical user interface rendered on the display 104c, provided by the client application, or any combination thereof), an issue request.

The issue request may include, by way of example, a request to open, create, or report an issue in a particular project; a request to modify an existing issue; a request to close an existing issue; a request to link an existing issue to another issue; a request to assign an issue to a particular user; a request to initiate an operation to detect one or more patterns of issue reporting (such as described herein); a request to initiate an operation to determine whether two or more issues are related; and the like. In some examples, in response to information or requests received from the client device 104, the issue tracking server 106 can submit a request to the repository server to add, modify, or delete data stored in one or more databases managed by the repository server.

In addition, the client device 104—and in particular, the client application executed by the client device 104—can be configured to receive, over the network 105, from the issue tracking server 106, without limitation: a suggestion of an issue to be opened in a particular project; a notification that one or more suggestions of issues to be opened are available for consideration; a request to provide information related to a particular issue; a request to confirm whether two issues, projects, or categorizations of issues are related or equivalent; and so on.

As such, generally and broadly, it may be appreciated that an issue tracking system, such as described herein, can perform multiple determinations and/or may make multiple suggestions to a user based on content entered by that user in the course of interacting with the system.

For example, in some cases, an issue tracking system may make a single determination of whether an issue request being entered by a user is likely to be a compound issue. In response to making this determination, the issue tracking system can suggest to the user that the user amend or otherwise narrow the issue request to describe only a single task or objective.

In other examples, an issue tracking system may make a two-step determination that includes (1) determining whether an issue request being entered by a user is likely to be a compound issue and (2) determining whether features extracted from the issue request being entered by the user are sufficiently similar to two or more previous issues received by the system.

In response to these determinations, the system can make multiple suggestions to the user including, but not limited to: suggesting the user enter another issue after narrowing or amending the first issue; suggesting removal or addition of content in the first issue (e.g., in a field already populated by the user or a field not yet populated by the user) based on one or more extracted features obtained from a previously-received issue; suggesting content in a suggested new issue based on one or more extracted features obtained from a previously-received issue (which may be the same or different from a previously-received issue used to optionally populate content in the first issue); suggesting the user enter another issue after completing the first issue, the other issue identified based on a determination that the first issue (being entered by the user) is similar to a previously-received issue that, in turn, has a relationship to another issue; and so on or any combination thereof.

In other words, an issue tracking system, such as described herein, can be configured to leverage and/or otherwise ascertain relationships between content of issues and/or issues themselves in order to provide suggestions to a user of that system specifically to reduce and/or eliminate compound issues in the issue tracking system. The suggestions—which can include suggestions to remove and/or add content—may be for content of the issue currently being entered by the user, for content of a subsequent (one or more) issue that may be opened by the user after the first issue is complete, for content of a separate issue not related to the first issue, and so on.

It may be appreciated that the foregoing examples are not exhaustive; more generally and broadly, it is appreciated the issue tracking server 106, the repository server, and the client device 104 can transact any suitable data or information, in any suitable form or format, across one or more communication channels or protocols, in a secure or encrypted manner, or in an unencrypted manner, and so on.

In view of the foregoing, it may be understood that the various descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
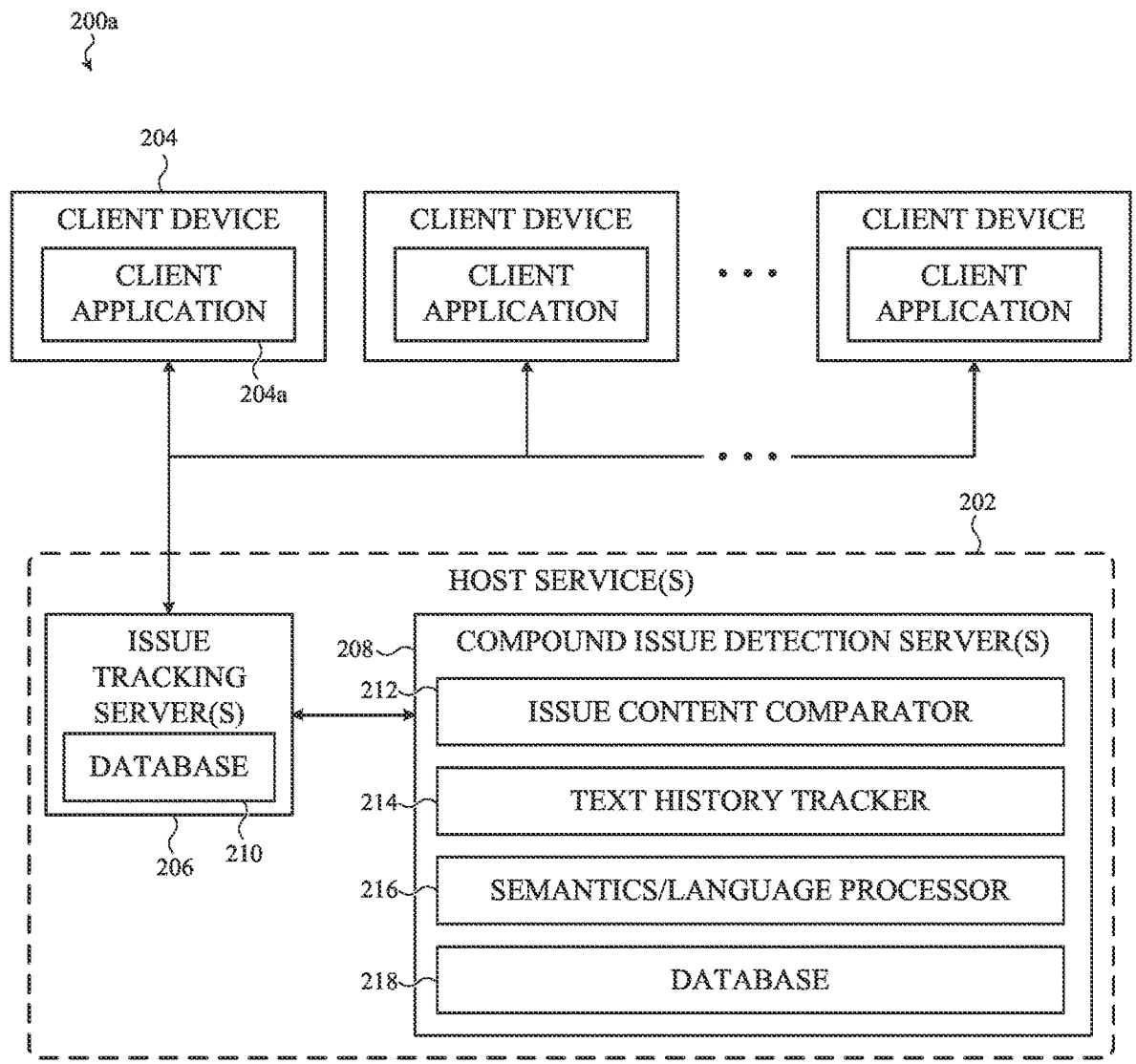
FIG. 2A is a system and signal flow diagram of an issue tracking system, such as described herein.

For example, FIG. 2A depicts a system and signal flow diagram of an issue tracking system, such as described herein. The issue tracking system 200a can be configured, both physically and operationally, in the same manner as the issue tracking system 100 described in reference to FIG. 1 and this description is not repeated.

The issue tracking system 200a can include a host service 202 configured to communicate with one or more client devices, one of which is identified as the client device 204. As with other embodiments described herein, the client device 204 can be configured to execute a client application 204a that is configured to transact information and data with the host service 202. The client application 204a provides a graphical user interface to facilitate interaction between the issue tracking system 200a and a user of that system.

The host service 202 includes an issue tracking server 206 that is communicably coupled to a compound issue detection server 208. As with other embodiments described herein, the issue tracking server 206 can include a database 210 or issue record repository that is configured to store information related to issues reported and closed for projects tracked by the issue tracking system 200a.

As with other embodiments described herein, the host service 202 also includes the compound issue detection server 208. In the illustrated embodiment, the compound issue detection server 208 can include a number of discrete subservices or purpose-configured modules, containers, or virtual machines each configured to perform, coordinate, serve, or otherwise provide one or more services, functions, or operations of the compound issue detection server 208. More particularly, the compound issue detection server 208 can include an issue content comparator 212, a text history tracker 214, a semantics/language processor 216, and a database 218.

The issue content comparator 212 of the compound issue detection server 208 can be configured in any suitable manner to implement the operation of comparing one or more issues for similarity. As noted above, this operation can be performed in a number of ways. An example method by which two issues can be compared includes comparing the text content of each issue to one another. For example, issue descriptions can be compared using any suitable text comparison technique.

The text history tracker 214 of the compound issue detection server 208 can be configured in any suitable manner to implement or otherwise perform the operation of inferring issue reporting patterns and/or extracting features from a given input issue record. More specifically, in one example, the text history tracker 214 can be configured to monitor and/or analyze the time and sequence in which various associated issues (e.g., issues in the same project, issues having the same categorization, and so on) were reported. In addition, the text history tracker 214 can be configured to monitor and/or analyze the content and extractable features of issue records reported to the system 200a.

The semantics/language processor 216 of the compound issue detection server 208 can be configured in any suitable manner to implement or otherwise perform the operation of providing natural language processing and/or analysis of content of one or more issues or issue contents. In one example, the semantics/language processor 216 can be leveraged by the issue content comparator 212 to compare the text content of two or more issues.

In another example, the semantics/language processor 216 can be leveraged by the text history tracker 214 in the course of determining or detecting one or more patterns of issue reporting. It may be appreciated that the semantics/language processor 216 may be suitably configured for purpose-agnostic natural language processing and/or text or string comparisons.

The database 218 or issue record repository of the compound issue detection server 208 can be configured in any suitable manner to implement or otherwise perform the operation of recording one or more detected patterns of issue reporting and/or extracted features. The database 218 can be accessed by any module or component of the compound issue detection server 208 at any suitable time to determine whether a particular issue matches and/or otherwise corresponds to a previously-detected pattern of issue reporting and, additionally, to determine whether content of a reported issue is likely to be a compound issue request.

It may be appreciated that the foregoing simplified examples are not exhaustive of the various possible components, systems, servers, and/or modules that may be used by an issue tracking system, such as described herein. Accordingly, more generally and broadly, it may be appreciated that an issue tracking system such as described herein can be configured to receive an issue request from a user, analyze the semantic content of one or more content items of that issue request, compare the content of that issue request to content of previously-detected issue requests, records or issue reporting patterns, and provide recommendations of additional actions that can be taken by the user based on a determined similarity between content in the newly-received issue request (e.g., two or more extracted features that are similar to content of two or more different previously-received issue records) and one or more previously reported issues or one or more previously-detected issue reporting patterns.

Figure 2B:
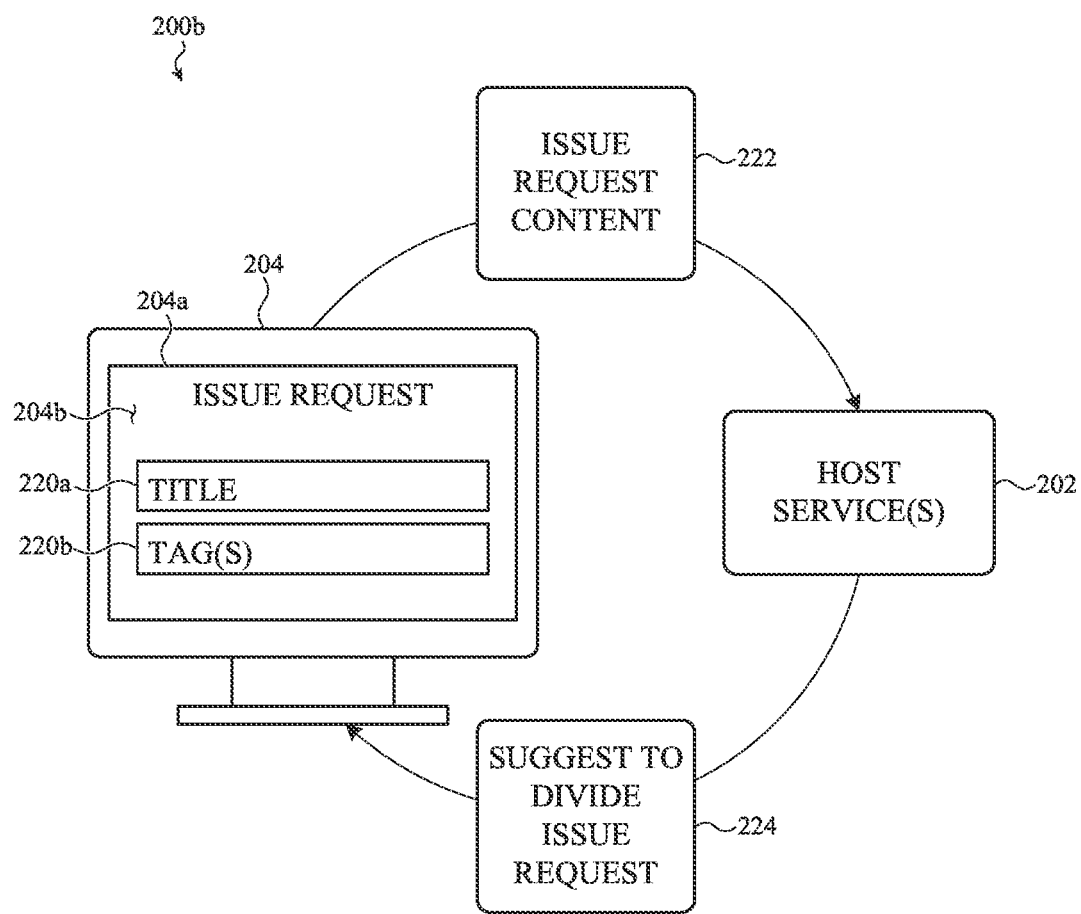
FIG. 2B is a signal flow diagram of an issue tracking system suggesting an issue, such as described herein.

For example FIG. 2B depicts an example signal flow diagram depicting communications between a client application operating on a client device and a host service of an issue tracking system, such as described herein. More specifically, as with the embodiment depicted in FIG. 2A, the issue tracking system 200b includes a host service 202 in communication with a client device 204. The client device 204 can execute an instance of a client application 204a. The client application 204a can render a graphical user interface 204b. The graphical user interface 204b can be used by a user to submit one or more issue requests (and/or to generate one or more issue records) to the host service 202. More specifically, the graphical user interface 204b can render one or more data entry fields, such as the data entry fields 220a, 220b illustrated in the figure, that can receive data entered by a user.

In one specific implementation of this example embodiment, a user can operate the graphical user interface 204b—which can be configured in any suitable manner—of the client application 204a to enter data into either or both of the data entry fields 220a, 220b to generate an issue request 222 for a specific project tracked by the issue tracking system 200b that can be submitted to the host service 202. In response to receiving the issue request 222, the host service 202—or, more precisely, a compound issue detection server or service of the host service 202 (see, e.g., FIG. 2A)—can perform one or more operations. For example, the host service 202 can determine whether the issue request 222 includes two or more extractable features related to content of two or more previously-received issues based on, without limitation: a title of the issue request 222 (e.g., keywords, semantic content, lemmatized content); a description of the issue request 222; a tag or group identifier of the issue request 222; and so on. In other words, the host service 202 can determine whether the issue request 222 includes content that is substantially similar to two or more separate, previously-received issues (i.e., indicating that the issue request 222 may be a compound issue request).

In response to determining that the issue request 222 is likely a compound issue request (e.g., via an output of a compound issue detection server), the host service 202 can inform the client device 204 and, in particular, the client application 204a executed by the client device 204 that the issue request 222 should be subdivided into multiple discrete issue requests.

In further implementations of the preceding example, the host service 202 can be configured to populate additional information in the recommended issue 224. For example, as noted above, a compound issue detection server such as described herein can be configured to compare the issue request 222 to all or some issues previously received by the host service 202. In some cases, if it is determined that a first keyword extracted from the issue request 222 is similar to a first previously-received issue and that a second keyword extracted from the issue request 222 is similar to a second previously-received issue, the host service 202 can determine that the issue request 222 is a compound issue. In other examples, if it is determined that the issue request 222 includes a conjunction that links two or more (e.g., a comma or semicolon-delimited list) noun phrases, the host service 202 can determine that the issue request 222 is a compound issue. In other examples, if it is determined that the issue request 222 includes a time estimation (or complexity estimation) that exceeds a threshold, such as a complete work day (e.g., eight hours or twenty four hours), the host service 202 can determine that the issue request 222 is a compound issue that should be broken down into more discrete tasks. These preceding examples are not exhaustive and other means of identifying a compound issue can be employed in other embodiments.

The foregoing embodiments depicted in FIGS. 1-2B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
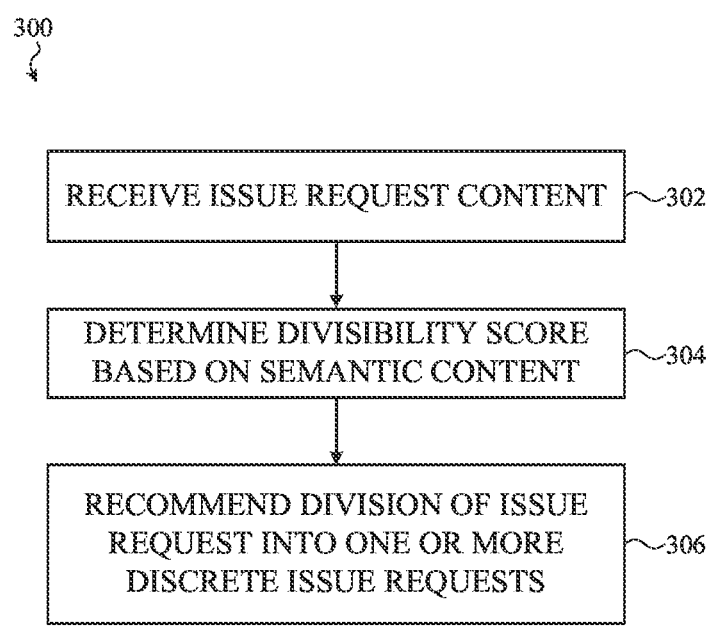
FIG. 3 is a flow chart that depicts example operations of a method of detecting compound issue requests in an issue tracking system, such as described herein.
Figure 4:
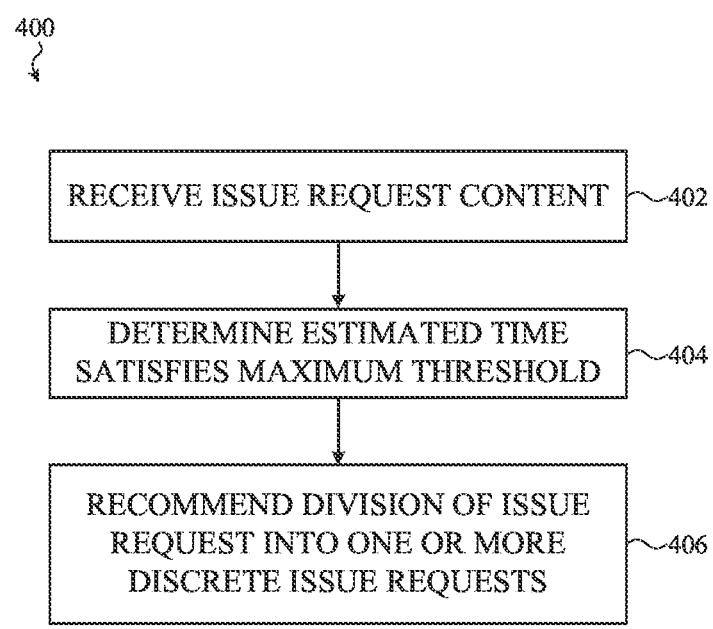
FIG. 4 is a flow chart that depicts example operations of another method of detecting compound issue requests in an issue tracking system, such as described herein.

Generally and broadly, FIGS. 3-4 depict flow charts corresponding to example simplified methods of operating a system, such as described herein.

FIG. 3 is a flow chart that depicts example operations of a method of detecting compound issue requests in an issue tracking system, such as described herein. The method 300 can be performed by any hardware or software, whether virtual or otherwise, such as described herein. In one example, the method 300 is performed, in whole or in part, by a compound issue detection server, such as described above.

The method 300 includes operation 302 in which an issue request—or a portion thereof—is received. As noted with respect to embodiments described herein, an issue request can be any suitable request and may take a number of forms and formats. In one embodiment, an issue request can take the form of a web-based form filled out by a user of an issue tracking system, such as described herein. The web-based form can include any suitable number of fields, data entry points, or other information. In other examples, the issue request can take the form of a formatted (e.g., javascript object notation or extensible markup language and the like) file transmitted from a client device or a client application to a host service, such as described above in reference to FIG. 1.

Regardless of form or format, it may be appreciated that an issue request can include any number of suitable data or information relating to the issue to be opened by the issue tracking system. Examples include, but are not limited to: an issue title; an issue description; an issue summary; an issue assignee; an issue reporter; an issue type; an issue category, cluster, or group; an indication of a projection to which the issue belongs; and so on.

In some cases, the issue request may be complete, meaning that all possible data fields that can comprise an issue request are populated. In other cases, the issue request may be partially complete, including only certain data.

Once the issue request is submitted by a user, client application, or client device, the method continues at operation 304 in which a divisibility score—or statistical likelihood—is determined based on the semantic content of the issue request received at operation 302. As noted with respect to other embodiments described herein, a divisibility score can be determined in a number of suitable ways. Example inputs that can be used by a system such as described herein to calculate or derive a divisibility score or statistical likelihood can include, but are not limited to: presence or absence of particular grammatical elements (e.g., prepositions, conjunctions, nouns, adjectives, and so on); presence or absence of keywords that are similar to keywords extracted from previously-received issues; a particular issue reporter; a particular issue complexity; a particular estimated time to completion; and so on.

The method 300 also includes operation 306, in which it is recommended to a user that the issue request submitted at operation 302 is divided into multiple discrete issues.

FIG. 4 is a flow chart that depicts example operations of another method of detecting similar or related issues in an issue tracking system, such as described herein. As with the embodiment described above in reference to FIG. 3, the method 400 can be performed in whole or in part by any hardware or software, whether virtual or otherwise, such as described herein. In one example, the method 400 is performed, in whole or in part, by a compound issue detection server, such as described above.

The method 400 includes operation 402 in which issue request content is received. As noted above, the issue request content can include a title, a description, a link to one or more other issues, an assignee, a reporting user, an attachment or screenshot, and so on. The content can be provided in any suitable form or format, in structured or unstructured digital or analog data. In some cases, the request content is received via a communications channel defined and/or established between a host service and a client device, such as described herein. For example, the communications channel can be a computer networking channel that includes the open Internet. In other cases, the communications channel is a private communications network.

In many cases, the data corresponding to the issue request content can take the form of digital data, although this is not required. The digital data can be sent wirelessly or over a wired network in the form of a signal, a data packet, a set of signals, a set of data packets, or in any other suitable manner.

Next the method 400 advances to operation 404 at which an estimated time content of that issue request is compared to a threshold value. In one example, the threshold value is between, and includes, eight hours and twenty four hours. The time content estimation can be derived from a time-to-complete estimation provided by a user or, alternatively or additionally, can be inferred by the system. For example, a user may enter a date at which the user expects the task to be complete. The system can infer, based on the current date, how long the issue request would take to complete based on an average work day.

In other cases, the user may enter a complexity score. As noted with respect to other embodiments described herein, a complexity score can be converted into an estimation of time by the system by comparing the content received at operation 402 to content previously received by the system that is already associated with a time estimation or, alternatively, is already completed as an issue. In these examples, the system can convert the complexity score to an estimation of time to complete and close the issue.

In still further examples, the system can be configured to extract one or more features from the content provided by the user at operation 402. Thereafter, the extracted features can be compared to entries in an extracted feature database. Once one or more matches are obtained as a result of this comparison, the system can assemble a set of time estimations based on how long previously-received issues containing similar content took to complete. For example, the system may determine that use of the phrase "authentication bug" is associated with a higher time to complete than use of the phrase "update localization strings" because previously-received issues that used phrases similar to the former took longer to complete than issues that used phrases similar to the latter.

In these examples, the system can be configured to assemble a set of time estimations (e.g., each entry corresponding to a time estimation associated with a single extracted feature). Thereafter, the system can select from the set the largest time estimation. In other cases, another time estimation can be selected.

Once a time estimation is obtained—independent of the means by which it was obtained—the method can compare the time estimation to a threshold value. In one example, the threshold value is a single work day (e.g., eight hours). This, however, is merely one example and any other suitable threshold can be used. Upon determining at operation 404 that the estimated time to completion exceeds or otherwise satisfies the threshold, the method 400 continues to operation 406 in which it is recommended to a user that the issue request submitted at operation 402 is divided into multiple discrete issues. In other words, the system can recommend to a user to subdivide the issue request if it is determined that the issue request will take longer than the threshold amount of time to complete. In one specific example, if the system determines that an issue request content submitted by a user is likely to take longer than eight hours to complete, the system can recommend to the user to subdivide the issue request into multiple discrete, shorter-timeframe, issue requests.

Figure 5:
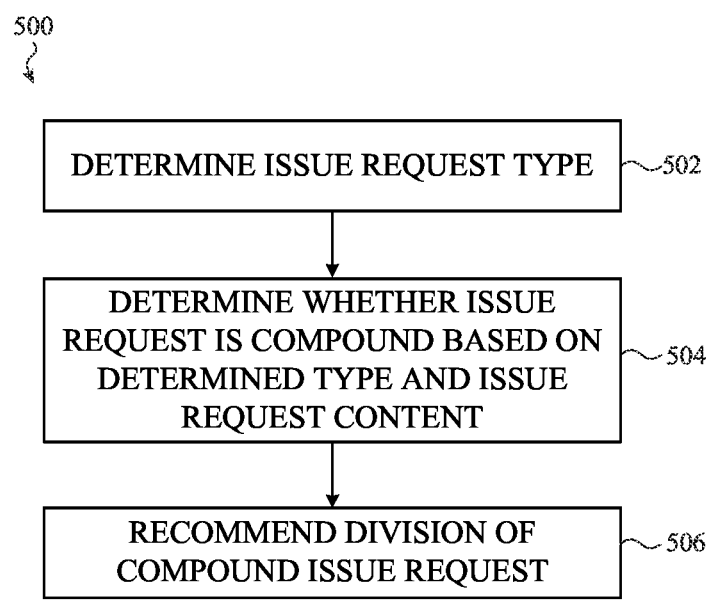
FIG. 5 is a flow chart that depicts example operations of another method of detecting compound issue requests in an issue tracking system, such as described herein.

FIG. 5 is a flow chart that depicts example operations of another method of detecting similar or related issues in an issue tracking system, such as described herein. As with the embodiment described above in reference to FIGS. 3-4, the method 500 can be performed in whole or in part by any hardware or software, whether virtual or otherwise, such as described herein. In one example, the method 500 is performed, in whole or in part, by a compound issue detection server, such as described above.

As with the method 400 described above, the method 500 includes operation 502 in which issue request content is received and, in response, an issue request type is determined from the issue request content. As noted above, the issue request content can include a title, a description, a link to one or more other issues, an assignee, a reporting user, an attachment or screenshot, and so on. As with other embodiments described herein, the content can be provided in any suitable form or format, in structured or unstructured data. In some cases, the request content is received via a communications channel defined and/or established between a host service and a client device, such as described herein. For example, the communications channel can be a computer networking channel that includes the open Internet. In other cases, the communications channel is a private communications network.

The system can determine an issue request type from the issue request content in a number of suitable ways. For example, as noted above, one or more fields of the issue request content can be preprocessed, lemmatized, tokenized or otherwise manipulated to normalize the content thereof into a semantic content dataset. For example, in one embodiment, all whitespace characters are converted to single spaces, all uppercase characters are converted to lowercase, punctuation is removed, and all words beyond a threshold number of characters are lemmatized and tokenized. From this semantic content dataset, the system can generate or otherwise extract one or more metadata items and/or statistical values. For example, the system may determine that the term "bug" is present and the term "task" is not present. In another example, the system may determine that more than a threshold number of words or sentences are used, which may be performed before or after text input by the user has been processed or preprocessed (e.g., lemmatized, tokenized, and so on).

With the semantic content dataset, the system can determine a likely issue type. For example, if the semantic content dataset includes the term "bug" or a similar word (e.g., within a particular threshold vector distance as determined by a word vector/similarity database) the issue request type may be determined to be "bug report." Similarly, of the semantic content dataset does not include the word "bug"—or a term sufficiently related to the word "bug"—the issue request type may be determined to be "task." In other examples, other signals extracted from the semantic content dataset can be used to indicate other issue request types; it may be appreciated that the foregoing examples are not exhaustive.

Next the method 500 advances to operation 504 at which the system can determine whether the issue request content corresponds to a likelihood that the associated issue request is a compound issue request. For example, a system such as described herein, may analyze historical data for a particular user or group of users to determine that issue requests typed as "bug reports" are statistically unlikely to be compound issue requests. Similarly, the same system may determine that issue requests typed as "feature request" or "story update" or similar types are statistically more likely to be compound issue requests. As such, at operation 504 the system can infer whether a likelihood exists that the issue request content entered by the user corresponds to a compound issue. The system may leverage any technique described herein to perform operation 504. For example, the system may leverage Bayesian inference to determine whether a compound issue is likely given that an issue request content is typed in a particular manner. For example, the system may determine as a user is providing input, that the user has referenced two separate and discrete projects and, additionally, that the user has used terminology associated with high-level (e.g., epic) project goals such as "implement" or "investigate." In response to the presence of both signals, the system may determine an increased likelihood that the user should break down the issue request into multiple discrete issue requests.

Finally, at operation 504, the method advances to recommend division of the issue request being entered by the user in response to determining at operation 504 that the issue request content type is likely to be associated with, and/or otherwise signal, a compound issue request.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. An issue tracking system comprising:
a host service operably coupled to a client application of a client device, the host service comprising a cooperating processor and memory configured to:
receive an issue request from the client application;
provide at least a portion of the issue request as input to a trained machine learning model;
receive as output from the trained machine learning model a divisibility score corresponding to the issue request;
in response to a determination that the divisibility score satisfies a divisibility threshold:
subdivide the issue request into two or more issue requests each at least partially populated with data extracted from the issue request; and
transmit the two or more issue requests to the client application.

2. The issue tracking system of claim 1, wherein the at least a portion of the issue request provided as input to the trained machine learning model comprises semantic content of a content item of the issue request.

3. The issue tracking system of claim 2, wherein:
the content item comprises an issue request description;
the semantic content comprises a set of lemmatized words extracted from the issue request description.

4. The issue tracking system of claim 3, wherein:
the divisibility score is increased in response to a first determination that the set of lemmatized words includes at least a threshold number of lemmatized words associated with compound issue requests; and
the divisibility score is decreased in response to a second determination that the set of lemmatized words does not include the threshold number of lemmatized words associated with compound issue requests.

5. The issue tracking system of claim 1, wherein the processor is further configured to:
identify one or more previously-received issue requests that satisfy a similarity threshold when compared to the issue request; and
populate one or more issue request templates with data extracted from the one or more previously-received issue requests.

6. The issue tracking system of claim 5, wherein the processor is further configured to determine a likelihood that the one or more previously-received issue requests include data that is substantially similar to the issue request.

7. The issue tracking system of claim 6, wherein:
a threshold is a first threshold; and
the processor is further configured to determine whether the likelihood satisfies a second threshold in order to identify the one or more previously-received issue requests that are substantially similar to the issue request.

8. The issue tracking system of claim 1, wherein:
the client device is communicably coupled to the host service by a network and is configured to receive input from a user to generate the issue request;
the client device is a first client device of a group of client devices each configured to transmit at least one issue request to the processor of the host service;
each client device of the group of client devices is coupled to the host service by the network.

9. A method of subdividing an issue request received by an issue tracking system, the method comprising:
receiving the issue request from a client device;
extracting as a content item, from the issue request, at least one of:
a time to completion estimate;
an issue category;
an issue assignee;
an issue reporter; or
an issue priority;
providing the content item as input to a trained machine learning model;
receiving as output from the trained machine learning model a divisibility score corresponding to a prediction whether the issue request can be completed in less than a threshold time window;
comparing the divisibility score to a divisibility threshold; and
upon determining that the divisibility score satisfies the divisibility threshold, generating a suggestion to the client device to subdivide the issue request.

10. The method of claim 9, wherein the content item comprises the issue assignee.

11. The method of claim 9, wherein the content item comprise the issue priority.

12. The method of claim 9, wherein the threshold time window is eight hours or less.

13. The method of claim 9, wherein the content item comprises semantic content of an issue description of the issue request.

14. The method of claim 13, wherein the semantic content comprises a word count of the issue description.

* * * * *